(12) United States Patent
Protasov et al.

(10) Patent No.: US 12,277,212 B2
(45) Date of Patent: Apr. 15, 2025

(54) SYSTEMS AND METHODS FOR SECURING CLOUD MEETINGS USING CONTAINERS

(71) Applicant: Acronis International GmbH, Schaffhausen (CH)

(72) Inventors: Stanislav Protasov, Singapore (SG); Anton Enakiev, Moscow (RU); Alexey Kostyushko, Moscow (RU); Vladimir Strogov, Moscow (RU); Serguei Beloussov, Costa del Sol (SG)

(73) Assignee: Acronis International GmbH, Schaffhausen (CH)

( * ) Notice: Subject to any disclaimer, the term of this patent is extended or adjusted under 35 U.S.C. 154(b) by 234 days.

(21) Appl. No.: 17/563,136

(22) Filed: Dec. 28, 2021

(65) Prior Publication Data

US 2022/0207134 A1 Jun. 30, 2022

Related U.S. Application Data

(60) Provisional application No. 63/132,578, filed on Dec. 31, 2020.

(51) Int. Cl.
*G06F 21/53* (2013.01)
*G06F 8/61* (2018.01)
*H04L 9/40* (2022.01)

(52) U.S. Cl.
CPC ............. *G06F 21/53* (2013.01); *G06F 8/61* (2013.01); *H04L 63/1416* (2013.01); *G06F 2221/033* (2013.01)

(58) Field of Classification Search
CPC ...... G06F 21/53; G06F 8/61; G06F 2221/033; H04L 53/1416

USPC ........................................................... 726/23
See application file for complete search history.

(56) References Cited

U.S. PATENT DOCUMENTS

| | | | |
|---|---|---|---|
| 10,922,418 B2* | 2/2021 | Morello | G06F 9/44505 |
| 2013/0055256 A1* | 2/2013 | Banga | G06F 9/45533 |
| | | | 718/1 |
| 2013/0055341 A1* | 2/2013 | Cooper | G06F 21/6281 |
| | | | 726/1 |
| 2017/0098072 A1* | 4/2017 | Stopel | G06F 21/51 |
| 2017/0171229 A1* | 6/2017 | Arzi | H04L 63/1425 |
| 2019/0097971 A1* | 3/2019 | Coleman | H04L 63/0281 |
| 2021/0209225 A1* | 7/2021 | Ghosh | G06F 21/566 |

(Continued)

*Primary Examiner* — Hee Soo Kim
(74) *Attorney, Agent, or Firm* — ArentFox Schiff LLP; Michael Fainberg

(57) ABSTRACT

Disclosed herein are systems and methods for securing cloud meetings using containers. In one aspect, an exemplary system comprises, a device comprising a processor, an OS operable in a user mode and a kernel mode, and a kernel driver for performing operations while in kernel mode, the kernel driver having a kernel driver interceptor configured to: register for a process notification callback for user applications used for web-based meetings, monitor to determine when a process notification callback is received, receive a process notification callback and a command line in the callback, and analyze and transmit the command line to a service that secures the meeting, wherein the securing is performed by: configuring a container for executing the user application in an isolated virtual environment, transferring, to the container, all resources needed to run the user application, and executing the user application in the container.

21 Claims, 6 Drawing Sheets

(56) References Cited

U.S. PATENT DOCUMENTS

2021/0312037 A1\* 10/2021 Revivo ................. G06F 21/577
2022/0200996 A1\* 6/2022 Strogov ................ H04L 65/403

\* cited by examiner

SYSTEMS AND METHODS FOR SECURING CLOUD MEETINGS USING CONTAINERS

CROSS-REFERENCE TO RELATED APPLICATIONS

This application claims the benefit of U.S. Provisional Application No. 63/132,578, filed Dec. 31, 2020, which is herein incorporated by reference.

FIELD OF TECHNOLOGY

The present disclosure relates to the field of increasing the security of cloud network based meetings, e.g., meetings conducts over web-based conferencing services.

BACKGROUND

At present, telecommunications companies facilitate communications over their networks to support various types of services. These companies attempt to provide end-to-end security. However, unlike for regular voice services, for many other services, security is not as well supported.

For example, telecommunication programs for web conferences, remote meetings, distance e-learning are often very poorly protected from intruders. Attackers can terminate a web meeting session by injecting malicious processes, modify registry keys in the operating system, steal confidential corporate data and personal information, load unsafe websites, etc. Teleconferencing software, such as the software used for conferences on Zoom, Cisco's Webex, Microsoft Teams, etc., provide protection for the communication channel between the server and client. However, the user endpoint devices used to access these services are practically unprotected and are easily vulnerable if malware penetrates the user machine. In some scenarios, a malicious process may be started on the user's device and may continue to gather confidential information even after the conferencing session is terminated. In another scenario, unsafe websites are loaded on the user's endpoint device for exploitation at a later time.

Thus, there is a need for providing protection not only for the channel between the server and the client but the user endpoint devices themselves.

SUMMARY

Aspects of the disclosure relate to the field of network security, more specifically to systems and methods for securing cloud meetings using containers.

In one exemplary aspect, a method is implemented in a computer comprising a hardware processor, the method comprising: registering for a process notification callback for one or more user applications used for creating or joining web-based meetings; monitoring to determine when a process notification callback is received for at least one of the one or more user applications; receiving a process notification callback and a command line in the callback; and analyzing the command line and transmitting the command line to a service that secures the meeting using containers, wherein the securing of the meeting is performed by: configuring a container for executing the user application in an isolated virtual environment; transferring, to the container, all resources needed to run the user application in the isolated virtual environment; and executing the user application in the container.

According to one aspect of the disclosure, a system is provided for securing cloud meetings using containers, the system comprising: a processor, an operating system (OS) operable in a user mode and a kernel mode, and a kernel driver having a kernel driver interceptor configured to: register for a process notification callback for one or more user applications used for creating or joining web-based meetings, monitor to determine when a process notification callback is received for at least one of the one or more user applications, receive a process notification callback and a command line in the callback, and analyze the command line and transmit the command line to a service that secures the meeting using containers, wherein the securing of the meeting is performed by: configuring a container for executing the user application in an isolated virtual environment, transferring, to the container, all resources needed to run the user application in the isolated virtual environment, and executing the user application in the container.

In one exemplary aspect, a non-transitory computer-readable medium is provided storing a set of instructions thereon for securing cloud meetings using containers, wherein the set of instructions comprises instructions for: registering for a process notification callback for one or more user applications used for creating or joining web-based meetings, monitoring to determine when a process notification callback is received for at least one of the one or more user applications, receiving a process notification callback and a command line in the callback, and analyzing the command line and transmitting the command line to a service that secures the meeting using containers, wherein the securing of the meeting is performed by: configuring a container for executing the user application in an isolated virtual environment, transferring, to the container, all resources needed to run the user application in the isolated virtual environment, and executing the user application in the container.

In one aspect, the configuring of the container for executing the user application includes: installing the user application; transferring objects and libraries needed to run the user application; and configuring functionalities and parameters of the user application.

In one aspect, the user application is implemented such that there can only be one session for the user application in the container.

In one aspect, a session of the user application is executed in the container such that the execution does not make modifications to other operations or processes running on a user endpoint device.

In one aspect, the method further comprises receiving a notification when the execution of the user application ends.

In one aspect, the method further comprises receiving a summary of data gathered during the execution of the user application in the container, wherein the summary includes information regarding at least one of: attempted malicious activities, identities of attackers, and durations of attacks.

In one aspect, the user endpoint device updates a local database based on the data received from the service, and makes decisions for subsequent requests from the user application based on the content stored in the local database, wherein the decision is either to deny or to allow a session to be invoked in the container.

The securing of cloud meetings using containers in accordance with the teachings of the present disclosure enables data of users and corporations to be protected.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 3 is a block diagram illustrating an exemplary virtualized execution environment of the present disclosure based on Windows 10 with the Windows Sandbox Features turned on.

FIG. 4 is a block diagram illustrating an exemplary virtualized execution environment of the present disclosure based on Windows 10 with the Hyper-V feature to support Nested Virtualization Features turned on.

DETAILED DESCRIPTION

Figure 1:
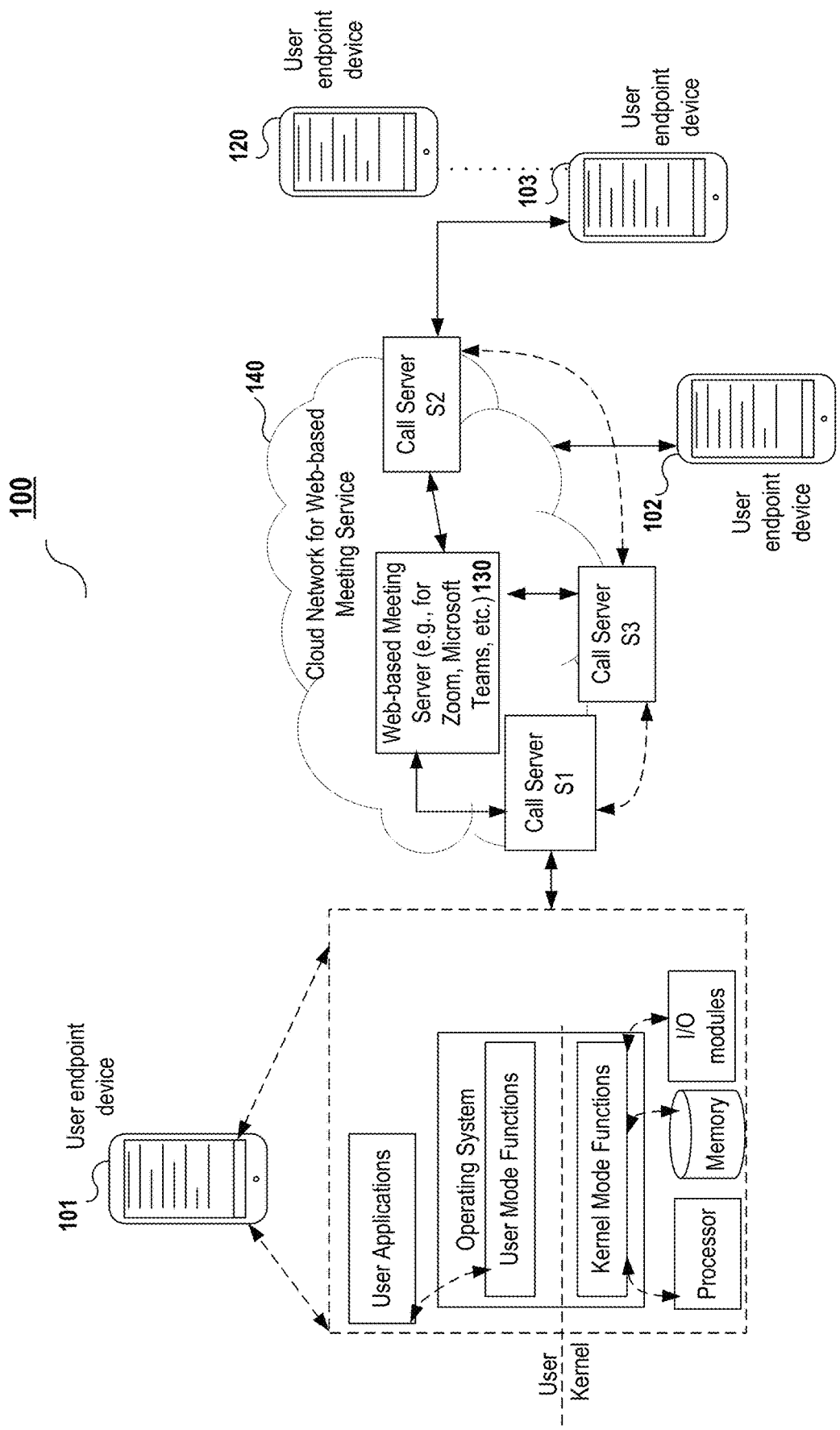
FIG. 1 is a block diagram illustrating an exemplary system for securing cloud meetings using containers in accordance with aspects of the present disclosure.

Exemplary aspects are described herein in the context of a system, method, and a computer program for securing cloud meetings using containers. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In one aspect, a system for providing network protection for securing cloud meetings using containers in accordance with the teachings of the present disclosure includes machines implemented on real-world devices, systems, components, and groups of components realized with the use of hardware such as integrated microcircuits (application-specific integrated circuit, ASIC) or field-programmable gate arrays (FPGA), or, for example, in the form of a combination of software and hardware such as a microprocessor system and set of program instructions, and also on neurosynaptic chips. The functionality of such system modules may be realized solely by hardware, and also in the form of a combination, where some of the functionality of the system modules is realized by software, and some by hardware. In certain aspects, some of the modules or all of the modules may be executed on the processor of a general-purpose computer (such as the one shown in FIG. 5). Furthermore, components of the system may be realized either within a single computing device or spread out among several interconnected computing devices.

For ease of understanding, the following terminologies are described below:

A "container" refers to a software application environment that is installed imitating dedicated hardware. The container is also referred to as a virtual machine (VM). The imitation of the dedicated hardware enables the end user to have the same experience on a container as he/she would have had on a dedicated hardware.

A "hypervisor" refers to a specialized software that emulates the hardware resources of the computing device, e.g., the CPU, memory, etc.

The hypervisor enables multiple containers to share the resources of the host physical hardware based system. Moreover, the hypervisor can emulate multiple virtual hardware platforms that are isolated from each other, thereby allowing the containers to run different operating systems, e.g., Linux or Windows OSs on the same underlying physical host.

Certain aspects of web-based conferencing services make them prime candidates for hackers to infiltrate a system. For example, web-based conferencing services normally access the camera and microphone settings of a computing device (e.g., a computer or a smartphone). This enables a malicious entity such as a hacker to eavesdrop on calls or at any time when the computing device is being used. For example, a malicious entity may inject code in a web-based conferencing application (e.g., Zoom) such that the application transmits a video/audio stream to the malicious entity at a given address whenever a call is taking place. In fact, the injection may enable access to the microphone and camera of a computing device even without displaying the user interface of the web-based conferencing application (and thus the user of the computing device may not even be aware that data is being sent to a malicious entity). This attack on privacy is highly dangerous because unlike attacks that perform data theft by stealing existing files (e.g., documents, images, etc.) in memory, in this case, information shared verbally or visually during calls can be stolen as well. The use of containers not only makes it more difficult to reach the web-based conferencing application, but in the event of malicious activity, encapsulates the activity within the container.

FIG. 1 is a block diagram illustrating an exemplary system 100 for securing cloud meetings using containers in accordance with aspects of the present disclosure. The system 100 for securing cloud meetings using containers includes user endpoint devices 101, 102, 103-120 and a cloud network 140 for a web-based meeting service. Only four endpoints are shown for simplicity, but any number of endpoints may be part of system 100.

The cloud network 140 may be a network of a meeting service, e.g., Zoom, Webex (from Cisco), Google Meets, Microsoft Teams, Google classroom, and the like. The meeting service is online thus the meeting participants are not in a same physical location. However, each participant is able to join a meeting by clicking on a previously provided link. For example, a host may schedule a meeting on a Zoom cloud network and send links to invitees. Each invitee may then click on the provided link, authenticate his/her identity (if needed) or provide a meeting password, and join the meeting. Participants may stay until the meeting ends, leave, and/or rejoin as needed. The host typically terminates the meeting when the meeting concludes.

The cloud network 140 includes any number of servers 130 used for web-based meetings and any number of call servers. Some exemplary functions of the servers 130 include interacting with user endpoint devices for signaling and content transmission, selecting an input (e.g., audio, video, shared presentation, and so on), from one of the user endpoint devices for transmission towards the other user endpoint devices, transcoding to various formats, and transmitting to the other user endpoint devices. In one aspect, the transcoding may be performed by other servers.

For a web-based meeting, a stream originates from devices, i.e., multiple video and audio devices, multiple shared screens, etc. Therefore, the web conference server 130 has to manage the various input streams to select which of the streams to send to all other user endpoint devices participating in the meeting. Then, the selected input stream is shared to all the meeting participants via call servers. The user endpoint devices are generally chosen by the particular user of the endpoint. Accordingly, the output stream is converted to an appropriate format for each recipient user endpoint device. Therefore, transcoders are typically used between the call servers and the endpoint devices.

In most scenarios, the call servers themselves are interconnected in layers to limit the number of endpoints each device needs to serve. For example, endpoints 101-110 may connect to call server S1, endpoints 111-120 may connect to call server S2, etc. Then call servers S1 and S2 may connect to the server 130, which is used for managing the inputs, via a call server S3.

The transcoding for user endpoints 101-110 may be done between the call server S3 and the server 130 managing the input streams, or between call servers S1 and S3. Similarly, the transcoding for user endpoints 111-120 may be done between the call server S3 and the server 130 managing the input streams, or between call servers S2 and S3.

Figure 2:
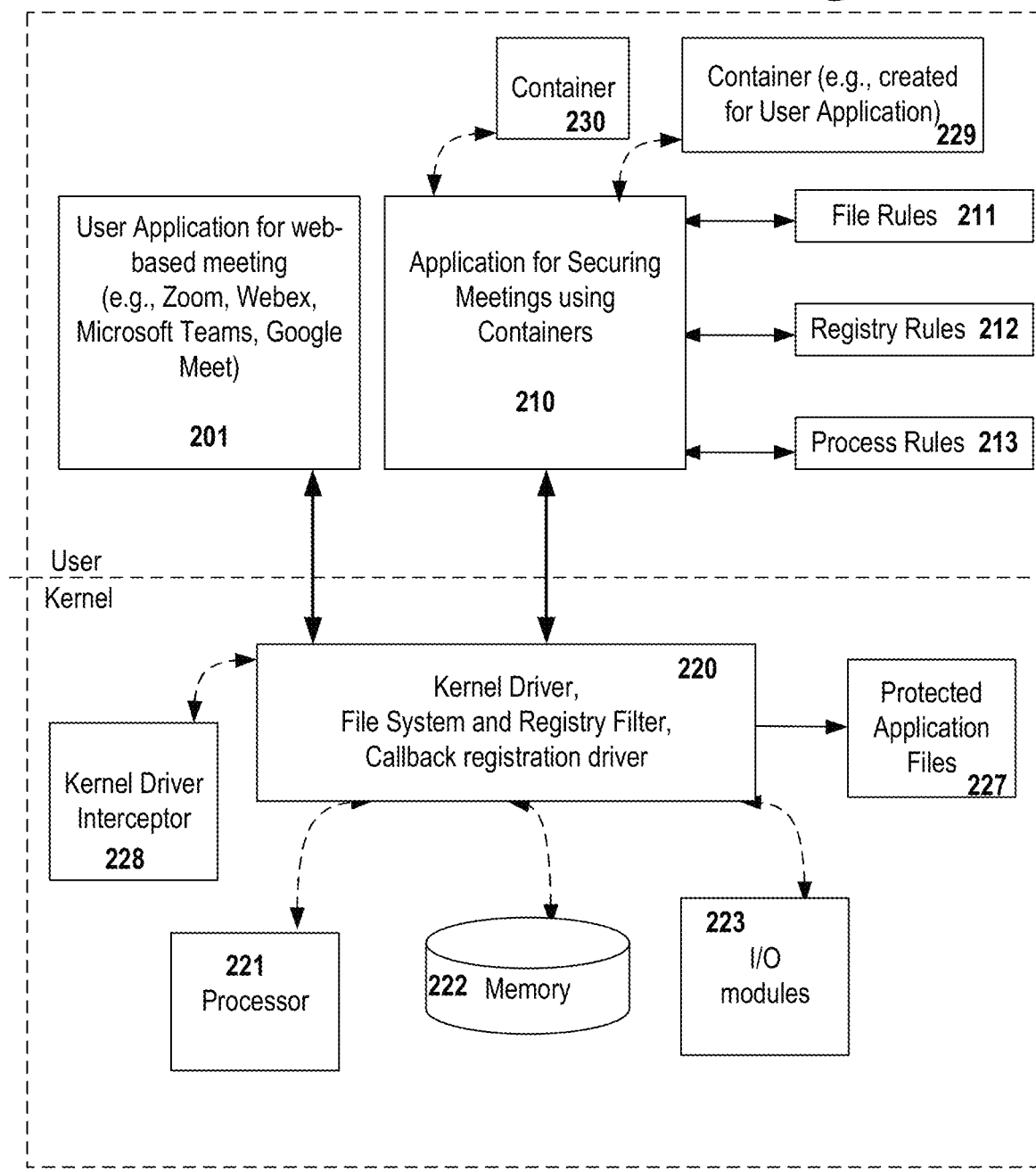
FIG. 2 is a block diagram illustrating an exemplary user endpoint device using containers for securing data when the user accesses cloud network based meetings in accordance with aspects of the present disclosure.

FIG. 2 is a block diagram illustrating an exemplary user endpoint device 200 using containers for securing data when the user accesses cloud network based meetings in accordance with aspects of the present disclosure. For example, the user endpoint device 200 may be any of the user endpoint devices 101-120 shown in FIG. 1.

When a user wants to join a web-based meeting, a user typically installs a user application 201 on his/her endpoint device. The user application is then invoked to start or join a meeting session. For example, a Zoom software application, a Microsoft Teams software application, etc., is installed on user devices. Depending on the platform on which the meeting is to occur, the user of the endpoint device invokes the software on his/her endpoint device. Thus, when user endpoint device is about to start or join a web-based meeting, the user application 201 starts executing on the device. For example, if the meeting is over Zoom, a Zoom application software starts running on the device of the user, such as on a computer, phone, and the like. When the user application starts running, the Operating System (OS) of the user endpoint device is in the user mode. While the application is executing in the user mode, only operations that do not require privileged access are executed. Whenever the privileged access is needed for an operation, the OS transitions to the kernel mode. For instance, operations that access the processor 221 (e.g., scheduling), memory 222 (e.g., mapping), I/O modules 223 (e.g., access ports/interfaces), file rules 211, registry keys 212 (e.g., modifying registry keys), process rules 213 (e.g., altering processes or adding processes), protected application files 227, and the like, are performed when the OS is in the kernel mode.

The kernel driver 220 utilizes a kernel driver interceptor 228 to detect operations to which it registers for process notification call backs. For example, the kernel driver interceptor 228 may register to receive a notification when processes related to web-based meetings, e.g., the user application 201, send a command to the kernel driver. The kernel driver interceptor 228 registers for a process notification callback and receives the command line in the callback. When the kernel driver interceptor 228 receives the process notification callback and the command line in the callback, the kernel driver interceptor 228 analyzes the command line, and transmits the command line to a service 210 of the present disclosure, wherein the service performs the securing of the meeting using a container 229 or 230.

In one aspect, the service performs the securing by configuring a container for executing the user application for web-based meetings in an isolated virtual environment. The service then transfers, to the container, all resources needed by the user application to run in the isolated virtual environment. The service then runs the application in the container. An example of a container is a Microsoft sandbox, as used in systems based on Microsoft's Windows 10 operating system.

In one aspect, the configuring of the container for executing the user application includes installing the user application (i.e., the third party software for Zoom, Google Meets, Microsoft Teams, Google classroom, etc.), transferring objects (e.g., files) and libraries needed to run the user application, and configuring functionalities and parameters of the user application. In one aspect, the resources transferred to the container include files and libraries, associated with the user application.

Figure 3:
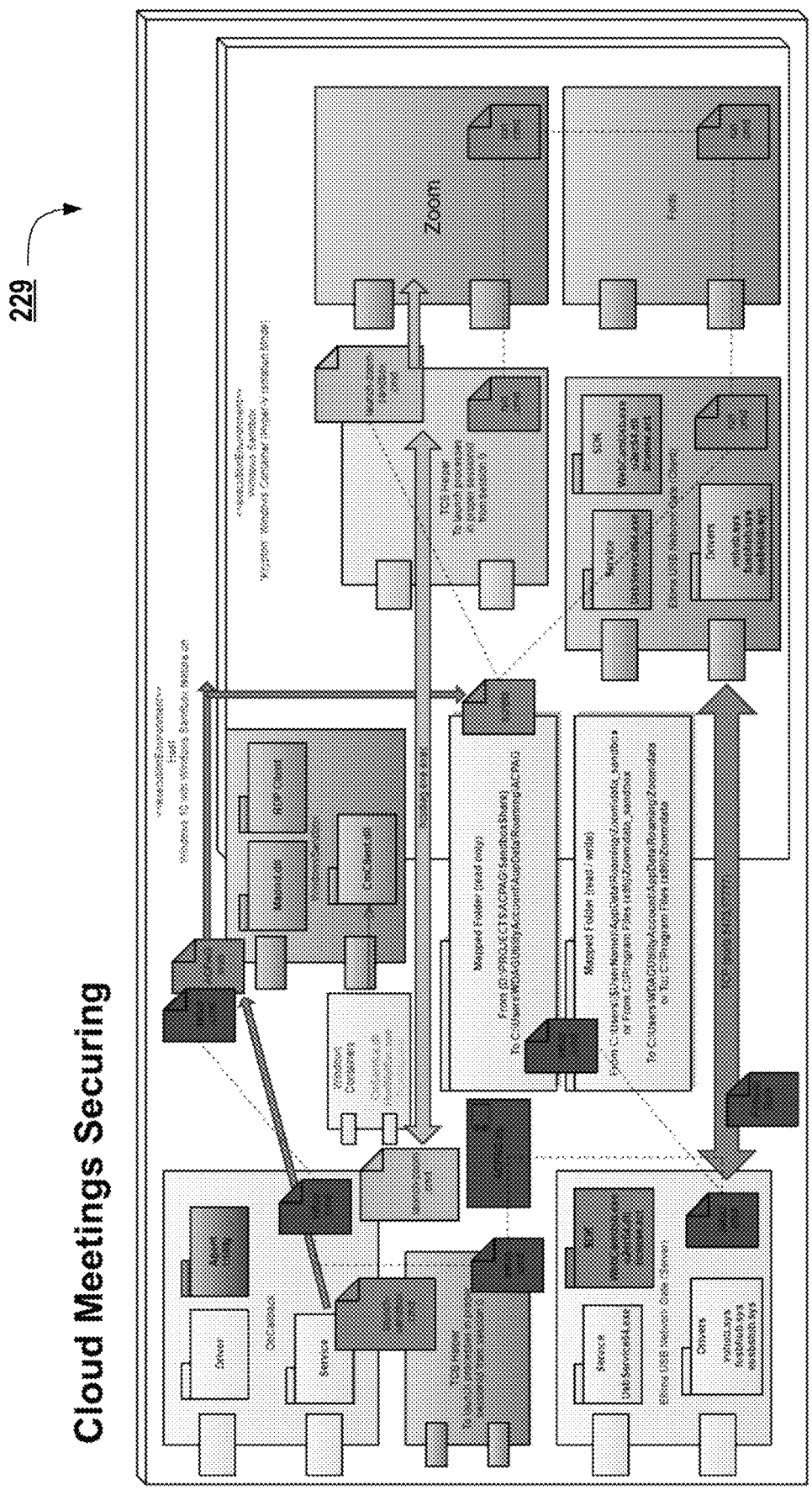

FIG. 3 is a block diagram illustrating an exemplary virtualized execution environment based on Windows 10 with the Windows Sandbox Features turned on. For instance, the container 229 may be implemented based on Windows 10 with the Windows Sandbox Features turned on.

For ease of description, the main components of FIG. 3 are illustrated for securing data when the user accesses cloud network for Zoom calls. The components include at least:
Zoom,
Windows Sandbox,
Eltima USB Network Gate SDK (+drivers and service),
Acronis Cyber Protection Application Guard (ACPAG) Watcher, abbreviated as "AcpagWatcher",
LaunchHelper, and
WebCamUsbTep.

The AcpagWatcher is used for blocking Zoom launch on the host and for intercepting a command line (including kernel mode driver). The LaunchHelper is used for launching sandbox and Zoom with an intercepted command line. The WebXamUsbTep is an SDK based utility used for WebCam redirection.

In FIG. 3, the portions including setup.cmd, ACPAG.zip, firewall rules, and the agent utility are installed once. The portions including the driver and service of ObCallback, Windows Containers (SmService.dll, HostNetSvc.eve, hcsdlag.eve), and Service UsbService64.exe, drivers: vuhub.sys, fusbhub.sys, eusbstub.sys of Eltima USB Network Gate (server) are used when working from installation (e.g., first-time) or from host start. and The portions including launh-zoom.cmd, hcsdiag.exe exec, TCB Helper, and launch-zoon-sandbox.cmd are launched during the lifetime of the sandbox (e.g., when the user wants to join another Zoom meeting). Other than the depicted mapped folders, all other portions are launched once with the sandbox (e.g., when one launchs Zoom for the first time).

Figure 4:
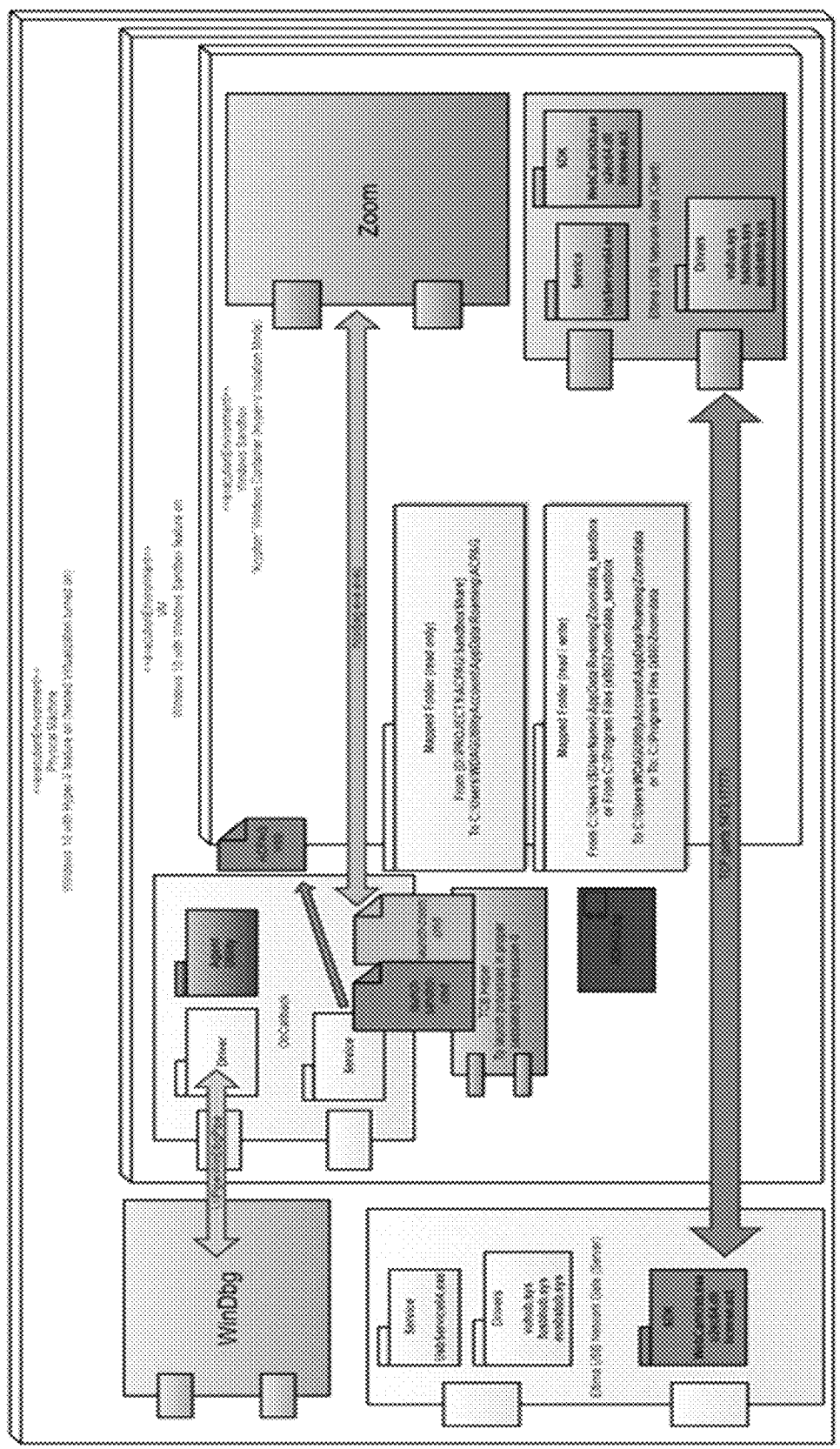

FIG. 4 is a block diagram illustrating an exemplary virtualized execution environment based on Windows 10 with the Hyper-V feature to support Nested Virtualization Features turned on. For instance, the container 230 may be implemented as shown in FIG. 4.

A development stand is used in order to safely test the ObCallback driver;
setup.cmd is used to edit: not to install USB Network Gate server into VM, and to edit to install only it on host; and
run.cmd is used to edit to launch WsbCamUsb.exe with IP address of host.

In one aspect, the user application is implemented such that there can only be one session for the user application in the container. For example, if the user application is Microsoft Teams, there can only be one session.

In one aspect, a session of the user application is executed in the container such that the execution in the container does not make modifications to other operations or processes running on the user endpoint device. For example, the container is in an isolated environment. The processor functions, memory, I/O modules, file rules, registry keys (e.g., modifying registry keys), process rules (e.g., altering processes or adding processes), etc. in the user endpoint device are not accessed by the container.

In one aspect, when a session of the user application ends, the service notifies the kernel driver. In one aspect, the service provides, to the kernel driver, a summary of data gathered during the execution of the user application in the container. In one aspect, the summary includes information regarding attempted malicious activities, identities of attackers, and duration of attack, etc. In one aspect, other data including quality of transmission channel, audio and video quality, noise measurements, etc. may be included.

In one aspect, the user endpoint device updates a local database (e.g., in the user endpoint device) based on the data received from the service. For example, a list of known attackers may be updated. In one aspect, based on the information received from the service, the kernel driver 220 makes decisions for subsequent session requests received from the user application, e.g., either denying or allowing the session to be invoked in the container. For instance, if a previous Zoom session hosted by a given entity had a malicious attack event, future invites may be declined.

Figure 5:
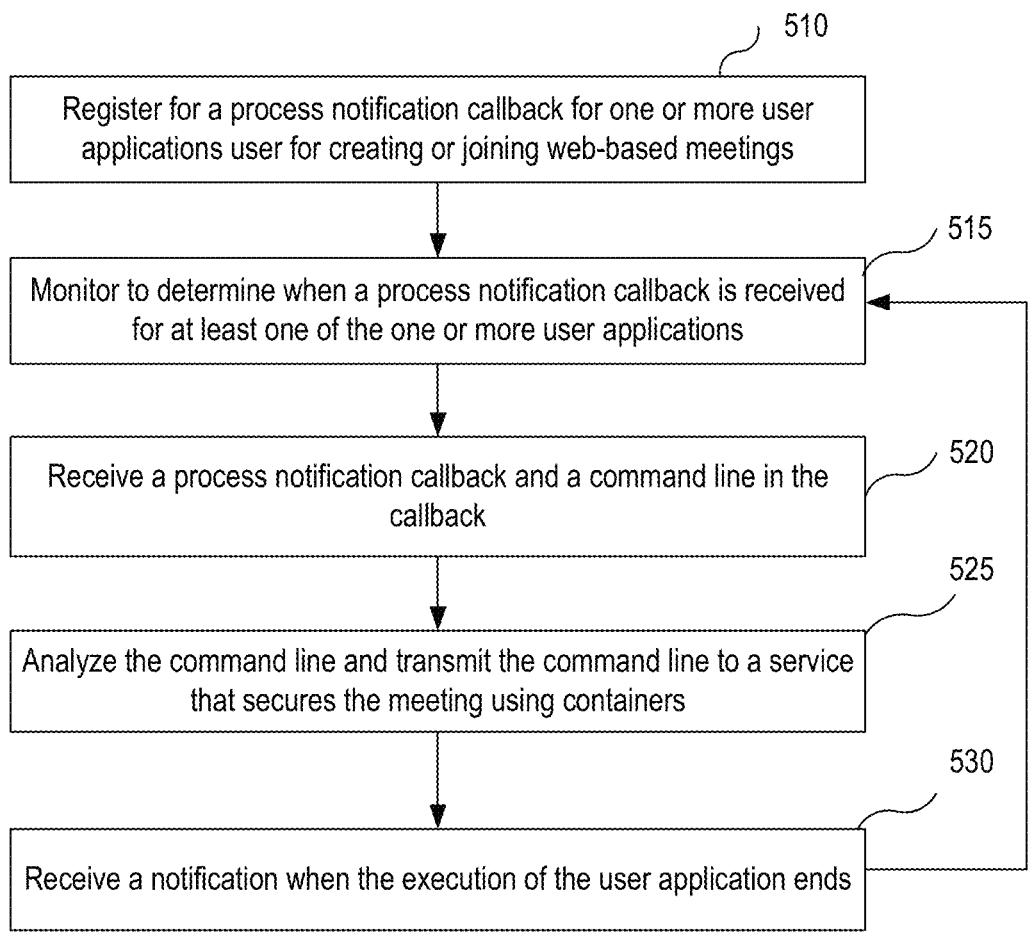
FIG. 5 is a flow diagram illustrating an exemplary method of a method for securing cloud meetings using containers in accordance with aspects of the present disclosure.

FIG. 5 is a flow diagram illustrating an exemplary method 500 of a system for securing cloud meetings using containers in accordance with aspects of the present disclosure.

In step 510, by a kernel driver interceptor 228, method 500 registers for a process notification callback for one or more user applications used for creating or joining web-based meetings. For example, the kernel driver interceptor 228 may register to receive process notification callbacks whenever Webex, Microsoft Teams, Zoom, Google Meet, etc. start a process.

In step 515, by the kernel driver interceptor 228, method 500 monitors to determine when a process notification callback is received for at least one of the one or more user applications. Thus, for each of the process notification callbacks it registered, the kernel driver interceptor performs monitoring to detect when the callback is received.

In step 520, by the kernel driver interceptor 228, method 500 receives a process notification callback and a command line in the callback. For example, suppose the user wishes to join a Zoom meeting. Then, a process notification callback and the associated command line in the callback is received for the Zoom user application that is initiated.

In step 525, by the kernel driver interceptor 228, method 500 analyzes the command line and transmits the command line to a service that secures the meeting using a container, e.g., container 229, wherein the securing of the meeting is performed by:

configuring a container for executing the user application in an isolated virtual environment;
    transferring, to the container, all resources needed to run the user application in the isolated virtual environment; and
    executing the user application in the container.

In step 530, by the kernel driver interceptor 228, method 500 receives a notification when the execution of the user application ends. For example, the service notifies the kernel driver interceptor 228 when a Zoom meeting is terminated. The method then proceeds to step 515 to continue monitoring.

In one aspect, the configuration of the container for executing the user application includes: installing the user application; transferring objects and libraries needed to run the user application; and configuring functionalities and parameters of the user application.

In one aspect, the user application is implemented such that there can only be one session for the user application in the container.

In one aspect, a session of the user application is executed in the container such that the execution does not make modifications to other operations or processes running on the user endpoint device. In one aspect, the container on which the execution of the present disclosure occurs is in a same physical device. In another aspect, the container is on a separate physical device. In either case, the processes, memory, etc. used for the container are isolated such that other processes on the user endpoint device are not affected by a malicious attack in the meeting.

In one aspect, the method further comprises receiving a notification when the execution of the user application ends.

In one aspect, the method further comprises receiving a summary of data gathered during the execution of the user application in the container, wherein the summary includes information regarding at least one of: attempted malicious activities, identities of attackers, and duration of attack.

In one aspect, the user endpoint device updates a local database based on the data received from the service, and makes decisions for subsequent requests from the user application based on the content stored in the local database, wherein the decision is either to deny or to allow a session to be invoked in the container.

As described above, the present disclosure describes systems and methods for securing cloud meetings using containers. One advantage of the method of the present disclosure is that the user endpoint device is protected from unauthorized alterations to processes, registry keys, system file rules, etc. Since the processes for the user application are executed in the container, the user endpoint device is protected even if the corruption occurs in the container.

Figure 6:
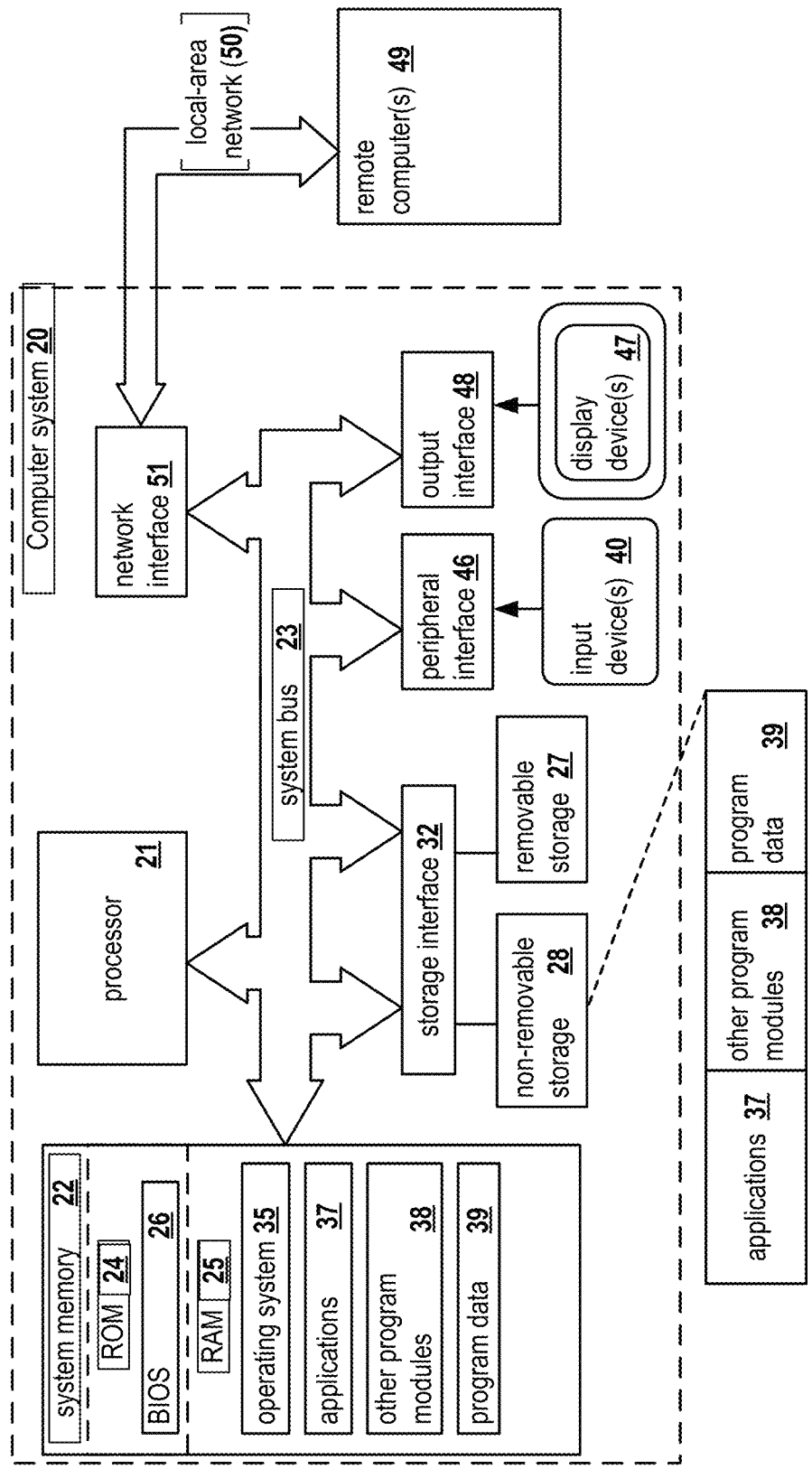
FIG. 6 presents an example of a general-purpose computer system on which aspects of the present disclosure can be implemented.

FIG. 6 is a block diagram illustrating a computer system 20 on which aspects of systems and methods for securing cloud meetings using containers may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for securing cloud meetings using containers, the method comprising:
   registering, by a kernel driver interceptor, for a process notification callback for one or more user applications used for creating or joining web-based meetings;
   monitoring, by the kernel driver interceptor on a physical device, to determine when the process notification callback is received for a user application of the one or more user applications;
   receiving, by the kernel driver interceptor, the process notification callback and a command line in the callback; and
   analyzing, by the kernel driver interceptor, the command line and transmitting the command line to a service that secures the meeting using containers, wherein the securing of the meeting is performed by:
   configuring, on a separate physical device, a container for executing the user application in an isolated virtual environment;
   transferring, to the container, all resources needed to run the user application in the isolated virtual environment; and
   executing the user application in the container;
   detecting a malicious attack event in a session of the user application, wherein the session is hosted by a given entity; and
   in response to detecting the malicious attack event, denying invites to join a subsequent session of the user application.

2. The method of claim 1, wherein the configuring the container for executing the user application includes:
   installing the user application;
   transferring objects and libraries needed to run the user application; and
   configuring functionalities and parameters of the user application.

3. The method of claim 1, wherein the user application is implemented such that there can only be one session for the user application in the container.

4. The method of claim 1, wherein a session of the user application is executed in the container such that the execution does not make modifications to other operations or processes running on a user endpoint device.

5. The method of claim 1, further comprising:
   receiving a notification when the execution of the user application ends.

6. The method of claim 1, further comprising:
   receiving a summary of data gathered during the execution of the user application in the container, wherein the summary includes information regarding at least one of: attempted malicious activities, identities of attackers, and durations of attacks.

7. The method of claim 1, wherein a user endpoint device updates a local database based on data received from the service, and makes decisions for subsequent requests from the user application based on content stored in the local database, wherein the decision is either to deny or to allow a session to be invoked in the container.

8. A system of a device for securing cloud meetings using containers, comprising:
   a processor;
   an operating system (OS) operable in a user mode and a kernel mode; and
   a kernel driver having a kernel driver interceptor configured to:
   register for a process notification callback for one or more user applications used for creating or joining web-based meetings;
   monitor, on a physical device, to determine when the process notification callback is received for a user application of the one or more user applications;
   receive the process notification callback and a command line in the callback; and
   analyze the command line and transmit the command line to a service that secures the meeting using containers, wherein the securing of the meeting is performed by:
   configuring, on a separate physical device, a container for executing the user application in an isolated virtual environment;
   transferring, to the container, all resources needed to run the user application in the isolated virtual environment; and executing the user application in the container;

detecting a malicious attack event in a session of the user application, wherein the session is hosted by a given entity; and in response to detecting the malicious attack event, denying invites to join a subsequent session of the user application.

9. The system of claim 8, wherein the configuring the container for executing the user application includes:

installing the user application;

transferring objects and libraries needed to run the user application; and configuring functionalities and parameters of the user application.

10. The system of claim 8, wherein the user application is implemented such that there can only be one session for the user application in the container.

11. The system of claim 8, wherein a session of the user application is executed in the container such that the execution does not make modifications to other operations or processes running on a user endpoint device.

12. The system of claim 8, wherein the configuration of the kernel driver interceptor further comprises a configuration for:

receiving a notification when the execution of the user application ends.

13. The system of claim 8, wherein the configuration of the kernel driver interceptor further comprises a configuration for:

receiving a summary of data gathered during the execution of the user application in the container, wherein the summary includes information regarding at least one of: attempted malicious activities, identities of attackers, and durations of attacks.

14. The system of claim 8, wherein a user endpoint device updates a local database based on data received from the service, and makes decisions for subsequent requests from the user application based on content stored in the local database, wherein the decision is either to deny or to allow a session to be invoked in the container.

15. A non-transitory computer readable medium storing thereon computer executable instructions for securing cloud meetings using containers, including instructions for:

registering for a process notification callback for one or more user applications used for creating or joining web-based meetings;

monitoring, on a physical device, to determine when the process notification callback is received for a user application of the one or more user applications;

receiving the process notification callback and a command line in the callback; and analyzing the command line and transmitting the command line to a service that secures the meeting using containers, wherein the securing of the meeting is performed by:

configuring, on a separate physical device, a container for executing the user application in an isolated virtual environment;

transferring, to the container, all resources needed to run the user application in the isolated virtual environment; and executing the user application in the container;

detecting a malicious attack event in a session of the user application, wherein the session is hosted by a given entity; and in response to detecting the malicious attack event, denying invites to join a subsequent session of the user application.

16. The non-transitory computer readable medium of claim 15, wherein the configuring of the container for executing the user application includes:

installing the user application;

transferring objects and libraries needed to run the user application; and configuring functionalities and parameters of the user application.

17. The non-transitory computer readable medium of claim 15, wherein the user application is implemented such that there can only be one session for the user application in the container.

18. The non-transitory computer readable medium of claim 15, wherein a session of the user application is executed in the container such that the execution does not make modifications to other operations or processes running on a user endpoint device.

19. The non-transitory computer readable medium of claim 15, wherein the instructions further include instructions for:

receiving a notification when the execution of the user application ends.

20. The non-transitory computer readable medium of claim 15, wherein the instructions further include instructions for:

receiving a summary of data gathered during the execution of the user application in the container, wherein the summary includes information regarding at least one of: attempted malicious activities, identities of attackers, and durations of attacks.

21. The non-transitory computer readable medium of claim 15, wherein a user endpoint device updates a local database based on data received from the service, and makes decisions for subsequent requests from the user application based on content stored in the local database, wherein the decision is either to deny or to allow a session to be invoked in the container.

* * * * *